US008639934B2

(12) United States Patent
Kruglick

(10) Patent No.: US 8,639,934 B2
(45) Date of Patent: Jan. 28, 2014

(54) RADIO CHANNEL METRICS FOR SECURE WIRELESS NETWORK PAIRING

(75) Inventor: Ezekiel Kruglick, Poway, CA (US)

(73) Assignee: Empire Technology Development LLC, Wilmington, DE (US)

(*) Notice: Subject to any disclaimer, the term of this patent is extended or adjusted under 35 U.S.C. 154(b) by 158 days.

(21) Appl. No.: 12/999,770

(22) PCT Filed: Jun. 10, 2010

(86) PCT No.: PCT/US2010/038145
§ 371 (c)(1),
(2), (4) Date: Dec. 17, 2010

(87) PCT Pub. No.: WO2011/155938
PCT Pub. Date: Dec. 15, 2011

(65) Prior Publication Data
US 2011/0307953 A1    Dec. 15, 2011

(51) Int. Cl.
*H04L 9/32*      (2006.01)
*G06F 11/00*     (2006.01)

(52) U.S. Cl.
USPC .......................................... 713/180; 726/22

(58) Field of Classification Search
USPC ............. 726/22; 380/270; 713/180, 189, 179; 375/296, 242, 244
See application file for complete search history.

(56) References Cited

U.S. PATENT DOCUMENTS

| | | | | |
|---|---|---|---|---|
| 6,021,202 A | * | 2/2000 | Anderson et al. | 705/54 |
| 6,301,235 B1 | * | 10/2001 | Raaf et al. | 370/332 |
| 7,120,562 B1 | * | 10/2006 | Wilson | 702/189 |
| 7,398,398 B2 | * | 7/2008 | Ofek et al. | 713/180 |
| 7,992,208 B2 | * | 8/2011 | Khandani et al. | 726/25 |

(Continued)

FOREIGN PATENT DOCUMENTS

| WO | WO 2009/032324 A2 | 3/2009 |
|---|---|---|
| WO | WO 2010/046515 A1 | 4/2010 |

OTHER PUBLICATIONS

Eagles, et al., "A comparative analysis of common threats, vulnerabilities, attacks and countermeasures within smart card and wireless sensor network node technologies" 2007, WISTP'07 Proceedings of the 1st IFIP TC6 /WG8.8 /WG11.2 international conference on Information security theory and practices: smart cards, mobile and ubiquitous computing systems, pp. 161-174. Abstract.

(Continued)

*Primary Examiner* — Kambiz Zand
*Assistant Examiner* — Abu Sholeman
(74) *Attorney, Agent, or Firm* — Hope Baldauff, LLC

(57) ABSTRACT

Technologies are generally described for using metrics of radio path characteristics within a wireless network to establish signal signature vectors. These signal signature vectors may be used as a shared secret between network nodes to establish affirmative identification. For example, a signal signature vector may be established when a new node sends a fixed number of packets to the existing nodes and the existing nodes send a fixed number of other packets back to the new node. The number of properly received packets can be counted to establish a success probability between the new node and each existing node. These probabilities can be normalized and quantized to generate signal signature vectors at each node. Without every transmitting any of the vectors, the vector at the new node should be highly correlated to the vectors at existing nodes since the pair-wise channels between each of the nodes should be reasonably symmetrical.

20 Claims, 6 Drawing Sheets

(56) References Cited

U.S. PATENT DOCUMENTS

| | | | |
|---|---|---|---|
| 8,402,536 B2* | 3/2013 | Rissa et al. | 726/22 |
| 2003/0177391 A1* | 9/2003 | Ofek et al. | 713/201 |
| 2004/0083368 A1* | 4/2004 | Gehrmann | 713/171 |
| 2005/0039103 A1* | 2/2005 | Azenko et al. | 714/776 |
| 2006/0184961 A1* | 8/2006 | Lee et al. | 725/32 |
| 2006/0203753 A1* | 9/2006 | Toskala et al. | 370/278 |
| 2007/0291691 A1* | 12/2007 | Gorokhov | 370/329 |
| 2008/0123851 A1* | 5/2008 | Guccione et al. | 380/270 |
| 2008/0235509 A1* | 9/2008 | Laberteaux et al. | 713/156 |
| 2009/0051594 A1* | 2/2009 | Na et al. | 342/373 |
| 2009/0063582 A1* | 3/2009 | Anna et al. | 707/203 |
| 2010/0067701 A1* | 3/2010 | Patwari et al. | 380/279 |
| 2010/0322224 A1* | 12/2010 | Bae et al. | 370/342 |

OTHER PUBLICATIONS

Sastry, et al., "Security Considerations for IEEE 802.15.4 Networks," 2004, Proceedings of the 3$^{rd}$ ACM Workshop on Wireless Security, Abstract.

Scannell, et al., "Proximity-based Authentication of Mobile Devices", Jan. 2009 International Journal of Security and Networks (IJSN), Special Issue on Secure Spontaneous Interaction, vol. 4, No. 1, pp. 4-16.

Schurgers, et al., "Distributed On-Demand Address Assignment in Wireless Sensor Networks", Oct. 2002, IEEE Transactions on Parallel and Distributed Systems, vol. 13, No. 10. Abstract.

International Search Report dated Sep. 9, 2010 in International Application No. PCT/US2010/038145.

Wilhelm, M., et al., "On Key Agreement in Wireless Sensor Networks based on Radio Transmission Properties," Workshop on Secure Network Protocols, IEEE, Oct. 13, 2009, pp. 37-42.

Patwari, N., et al., "High Rate Uncorrelated Bit Extraction for Shared Secret Key Generation from Channel Measurements," IEEE Transactions on Mobile Computing, Jan. 2010, vol. 9, No. 1, pp. 1-15.

"Blue Tooth Phone Vulnerability" Apr. 13, 2005, downloaded from http://www.acmetech.com/blog/2005/04/13/bluetooth-phone-vulnerability/, 4 pages.

ZigBee Specification, Jan. 17, 2008, Doc. No. 053474r17, ZigBee Standards Organization, 604 pages.

* cited by examiner

ATTENUATION TABLE 210

|      | 120A | 120B | 120C | 120D | 120E | 120F | 120G | INTRUDER |
|------|------|------|------|------|------|------|------|----------|
| 120A |      | 1    | 1    | 2.8  | 2    | 2.2  | 1.4  | 6        |
| 120B |      |      | 2.8  | 2    | 4.4  | 4    | 2.2  | 6.1      |
| 120C |      |      |      | 1    | 1    | 2.8  | 1    | 1        |
| 120D |      |      |      |      | 2.8  | 1    | 2    | 1        |
| 120E |      |      |      |      |      | 2    | 1.4  | 6        |
| 120F |      |      |      |      |      |      | 4.4  | 12       |
| 120G |      |      |      |      |      |      |      | 1        |

RECEPTION PROBABILITY TABLE 220

|      | 120A | 120B | 120C | 120D | 120E | 120F | 120G | INTRUDER |
|------|------|------|------|------|------|------|------|----------|
| 120A |      | 1    | 1    | 0.36 | 0.5  | 0.45 | 0.71 | 0.17     |
| 120B |      |      | 0.36 | 0.5  | 0.23 | 0.25 | 0.45 | 0.16     |
| 120C |      |      |      | 1    | 1    | 0.36 | 1    | 1        |
| 120D |      |      |      |      | 0.36 | 1    | 0.5  | 1        |
| 120E |      |      |      |      |      | 0.5  | 0.71 | 0.17     |
| 120F |      |      |      |      |      |      | 0.23 | 0.08     |
| 120G |      |      |      |      |      |      |      | 1        |

NEW NODE KEY 230
INTRUDER KEY 240

FIG. 2

RADIO CHANNEL METRICS FOR SECURE WIRELESS NETWORK PAIRING

BACKGROUND

Unless otherwise indicated herein, the materials described in this section are not prior art to the claims in this application and are not admitted to be prior art by inclusion in this section.

Ubiquitous computing (ubicomp) depends heavily on wireless networking technology to support the automatic participation of many everyday objects in a computing environment. Example solutions for wireless communications for ubicomp may include wireless local area network (WLAN) technology or wireless personal area network (WPAN) technology. Related network solutions may include Bluetooth, ZigBee, WirelessHART, WiFi, MiWi, various other wireless communication solutions, and various technologies promulgated by the IEEE 802 working groups.

While security is an important concern for wireless networks, there must generally be a cryptographic key exchange between network devices to support secure operations. For improved security, keys may be entered into devices manually. It is generally understood that most users will not engage in physical key transcription or the plugging in of key tokens for every device that enters into, or pairs with, a ubicomp network. For example, manually entering a security key into a wireless mouse at the time of purchase, or worse yet every time it is used at a different computer, is not a particularly user friendly activity. This concern multiplies as ubicomp expands. For example, a purchaser of a new kitchen might be entering security keys for blenders, refrigerators, can openers, garbage disposals, each AC power outlet, each light switch, a thermostat, microwave oven, coffee maker, so on, and so on. As such, automatic wireless key exchange is almost a necessity for devices joining a ubicomp network.

For improved usability, there is an expectation that keys are simply transmitted, or broadcast, between devices during a device pairing process when a device joins to the network. Unfortunately, the network will suffer a moment of vulnerability every time a device joins or rejoins a network and keys are transmitted. An example of how this vulnerability can be exploited is by a remote antenna establishing a "man in the middle" attack as devices are accepted into the network. A remote attacker may also be able to force nodes to reintroduce themselves to the network and perform a new wireless key exchange. As such, a wireless ubicomp system can be made to introduce new security vulnerabilities on demand.

SUMMARY

The present disclosure generally describes some computer-implemented methods for securely pairing a new node into a wireless network. According to some example methods, the new node performs one or more of the following operations. The new node measures a characteristic of a radio channel between the new node and an existing node in the wireless network. The new node establishes a signal signature based upon the measured characteristic of the radio channel. The new node establishes secure communications between the new node and the existing node in the wireless network secured by the signal signature The present disclosure generally describes some computer storage media. Some example computer storage media include computer-executable instructions stored thereon for a method which, when executed by a computer, adapt the computer to securely pair a new node into a wireless network. According to some example methods, the computer performs one or more of the following operations. The computer measures a characteristic of a radio channel between the new node and an existing node in the wireless network. The computer establishes a signal signature based upon the measured characteristic of the radio channel. The computer establishes secure communications between the new node and the existing node in the wireless network secured by the signal signature.

The present disclosure generally describes some apparatuses adapted to establish a secure communication channel between a new node and an existing node in a wireless network. Some example apparatuses include a radio and/or a controller. Some example radios receive and transmit radio communication over a radio channel between the new node and the existing node. Some example controllers are coupled to the radio and perform one or more of the following operations. The controller measures a characteristic of a radio channel between the new node and the existing node in the wireless network. The controller establishes a signal signature based upon the measured characteristic of the radio channel. The controller establishes secure communications between the new node and the existing node in the wireless network secured by the signal signature.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 2 is a data diagram illustrating an example attenuation table and an example reception probability table;

DETAILED DESCRIPTION

Figure 1:
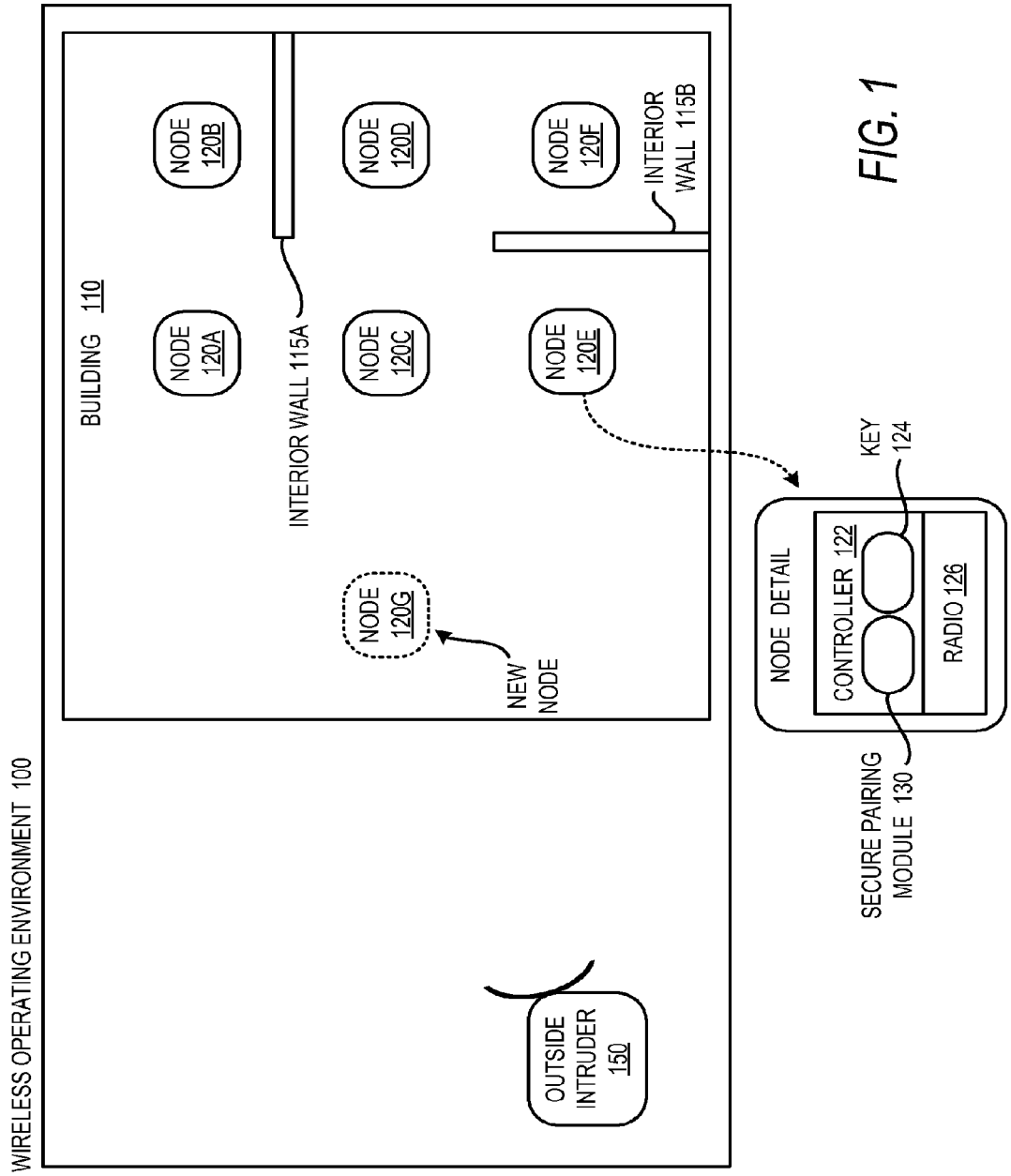
FIG. 1 is a block diagram illustrating an example wireless operating environment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the present disclosure, as generally described herein, and illustrated in the figures can be arranged, substituted, combined, separated, and designed in a wide variety of different configurations, all of which are explicitly contemplated herein.

This disclosure is generally drawn, inter alia, to methods, apparatus, systems, and computer program products related to using radio channel metrics for wireless network pairing. Radio path characteristics within a wireless network may be used to establish signal signature vectors. These signal signature vectors may be used as a shared secret between network nodes to establish affirmative identification. One example for establishing a signal signature vector involves a new node sending a fixed number of packets to the existing nodes and the existing nodes sending a fixed number of other packets back to the new node. The participants at each end can count the number of properly received packets and from this establish a success probability between the new node and each existing node. These probabilities can be normalized and quantized to generate a first signal signature vector at the new node.

The existing nodes can securely share their success probability counts to separately establish a second signal signature vector. The first and second signal signature vectors should be highly correlated since the pair-wise channels between each of the nodes should be reasonably symmetrical. Thus, a shared secret may be established that cannot be sensed by a remote antenna since that antenna will have a different channel between itself and the existing nodes. This shared secret may be used to prevent the remote antenna attacker from establishing a "man in the middle" attack. Improved security of this nature can provide devices the convenience of over-the-air introduction without compromising network security.

FIG. 1 is a block diagram illustrating an example wireless operating environment 100, arranged according to one or more embodiments presented herein. A wireless network made up of six existing nodes 120A-120F can operate within a building 110. A new node 120G may be introduced into the building 110 where it can attempt to join the network. An outside intruder 150 may attempt to snoop and/or spoof network traffic using their own communications equipment and possibly a parabolic, or otherwise highly directional, antenna. The outside intruder 150 can attempt to exploit the brief vulnerability introduced by the traditional wireless key sharing process when the new node 120G attempts to join the network. Using the technology disclosed herein, the new node 120G can securely share a key and join the existing network without opening up the traditional open key transmission vulnerability.

The nodes 120A-120G may be referred to collectively, or in general, as nodes 120. Each node 120 may include a controller 122. The controller 122 can be configured to perform various control and/or communication operations associated with the node 120. For example the controller 122 may include a secure pairing module 130 configured for carrying out the techniques discussed herein. The controller 122 may also be configured to interface with a radio 126 to provide wireless communication services for the node 120. The controller may be configured to use a key 124 (or several keys) to secure the communication services provided using the radio 126. The controller 122 may include various modules, wherein each module may be an electronic circuit, a state machine, a programmable device, a microcontroller, a microprocessor, a central processing unit (CPU), a computer program, a software module, a firmware modules, any other type of controlling mechanism, or any combination thereof.

The relative positions of the nodes 120 within the building 110, along with the radio environment around and between each of the nodes 120, can be arranged to establish a set of unique radio path characteristics within the wireless network. For example, the radio channel between the new node 120G and the existing node 120E may have measurably less attenuation than the radio path between the new node 120G and the existing node 120F because of the interior wall 115B positioned between the new node 120G and the existing node 120F. Similarly, the interior wall 115A may increase attenuation of the radio path between the new node 120G and the existing node 120B.

When the new node 120G attempts to join the network, the radio paths can be measured by some or all of the nodes 120. The measurement values may be used to establish signal signature vectors. Substantial symmetry of the radio channels can result in a signal signature vector measurement at the new node 120G being substantially similar to a signal signature vector measured collectively by the existing nodes 120A-120F. Thus, the signal signature vector can serve as a shared secret between network nodes 120. The signal signature vectors may then be used as a key 124, as a shared secret between network nodes 120 for exchanging a key 124, or any other secure communication or authentication mechanism.

An example for establishing a signal signature vector, the new node 120G can send a specified amount of traffic to each of the existing nodes 120A-120F. Each of the existing nodes 120A-120F can count how many of those packets are properly received. In some examples, a properly received packet might be defined as a packet received without bit errors, without uncorrectable bit errors, or some other metric of correct packet reception. The existing nodes 120A-120F can be configured to avoid sending acknowledgment packets or sharing their received packet counts over the air to the new node 120G since this may be intercepted by the outside intruder 150. The existing nodes 120A-120F may however be configured to share their packet counts amongst themselves using the existing secured network.

The existing nodes 120A-120F can also be configured to send a fixed number of packets to the new node 120G. The new node 120G can be configured to count the number of correctly received packets without sending acknowledgements or sharing the count number over the air. Since the radio channels are substantially symmetrical, the new node 120G should have a similar attenuation characteristic when transmitting to each of the existing nodes as when the respective existing node transmits to the new node 120G. For example, the wireless channel from the new node 120G to the existing node 120A should have a similar attenuation characteristic as the opposite channel from the existing node 120A to the new the new node 120G. Thus, the new node 120G should have a count number of successfully received packets from the existing node 120A that is similar to the count number that the existing node 120A has for successfully received packets from the new node 120G. This value of the number of correctly received packets (e.g., success packet count) can now be a shared secret (e.g., secret packet count) known only to the existing node 120A and the new node 120G. The secret packet count will not be transmitted in an unsecure region where it can be intercepted by the outside intruder 150. These secret packet counts can be symmetrically established to some accuracy for each possible matching, or some subset thereof, between the new node 120G and each of the existing nodes 120A-120F.

The value of the counts of correctly received packets can be used to calculate a probability of reception. In particular, the new node 120G can use its measurements of the channels to each of the existing nodes 120A-120F, while the existing nodes 120A-120F can share their measurements to provide a similar measurement vector at each of the existing nodes 120A-120F. The probabilities making up the vector of measurements can be normalized and quantized to generate the signal signature vectors. Normalizing can factor out scaling factors from the channel metrics to increase the likelihood of the signature vectors being symmetrical. Quantizing can reduce the accuracy of the measurements to a higher granularity such that minor variations between the directions of the channel are smoothed out. This quantization can increase the likelihood of the signature vectors being symmetrical. According to some embodiments, key exchange techniques may be used with the signal signature vectors. Quorum coding may be applied to the vectors such that a key will function as long as a certain number of bits, or entries within the key vector, are correct. A certain amount of errors in the key do not prevent the algorithms from functioning as long as the quorum of correct key elements is met. Thus, slight variations in the measuring of the radio paths between the new node 120G and the existing nodes 120A-120F may be tolerated.

It should be appreciated that the outside intruder 150 can have a dramatically different set of radio paths to the existing nodes 120A-120F than does the new node 120G. Thus the outside intruder 150 is highly unlikely to reproduce the same signal signature vector as the new node 120G. In the unlikely scenario where the outside intruder 150 is actually co-located with the new node 120G, the signal signature vector of the outside intruder 150 may be distinguishable from that of the new node 120G because of the differences in antenna shape and antenna positioning of the new node 120G compared to the outside intruder 150.

Various measurements of radio path characteristics are provided within many wireless networking protocols. For example, probability of reception statistics are built into the ZigBee standard. Similar metrics are generally available in Bluetooth or other ubicomp technologies. These existing radio channel measurement provisions may be leveraged in the generation of the signal signature vectors according to the technology discussed herein.

In some scenarios, one or more of the existing nodes may be wired directly to a secure network as opposed to being wireless nodes. The new node 120G may attempt to measure characteristics of the radio channel to each of the nodes 120 having wireless capability. The signal signature vectors can be based off of these wireless nodes to support securely pairing the new node 120G into a network of both wired and wireless networked devices.

Reducing pairing vulnerability using the technologies discussed herein can support power saving approaches. For example, a seldom used node 120 such as an attic temperature sensor, sprinkler unit, or garden sensor can ignore the radio network and simply remain off, or idle, for extended periods of time, such as many hours or days. When the node returns to operation, the node can reestablish pairing with the network without vulnerability. There can be an added benefit of reducing the exposure of such nodes 120 to physical hacking by leaving them off (i.e. communication are disabled in the device) and without network keys for most of the time.

Turning now to FIG. 2, a data diagram illustrates an example attenuation table 210 and an example reception probability table 220, arranged according to one or more embodiments presented herein. The attenuation table 210 shows the attenuations between each of a set of existing nodes 120A-120F, a new node 120G, and an outside intruder 150. The illustrated attenuation values have been normalized so that the lowest attenuation values are unity or one.

The reception probability table 220 relates to the attenuation table 210. Since higher attenuation usually results in lower probability of reception, the relationship of the values is approximately an inverse relationship. Values for the reception probability table 220 can be measured by sending a specified number of packets and counting the number of packets with correct (e.g., error free) arrivals.

A signal signature vector for the new node 120G is shown as a new node key 230, while a signal signature vector for the outside intruder 150 is shown as the intruder key 240. In this example, the outside intruder will not have a signal signature vector that is close enough to the signal signature vector for the new node 120G to allow a security exploit by the outside intruder 150.

Values in the reception probability table 220 or other signal metrics may have slight variations between the two directions due to random variation, noise, and momentary interference effects. The secure pairing modules 130 of each node 120 can construct keys or verification messages based on these measurements that can accommodate a specified amount of variance. For example, each secure pairing module 130 can increase the quantization steps of its measurements such that the step size is greater than the error of measurements. According to some other embodiments, each secure pairing module 130 may also use lower fidelity scores, introduce homomorphism, transmit multiple confirmation messages with different signal vector elements, use a quorum of agreements among the measurements, or employ any other mechanism for accommodating slight variations in the radio channel measurements may be employed. In instances where too many values within the reception probability table 220 are at unity, the secure pairing modules 130 may invoke a back-off approach where power levels are lowered to enter a regime of non perfect packet reception. This reduced power level may support establishing meaningfully variable signal signature vector values that are not all at a maximum value.

Figure 3:
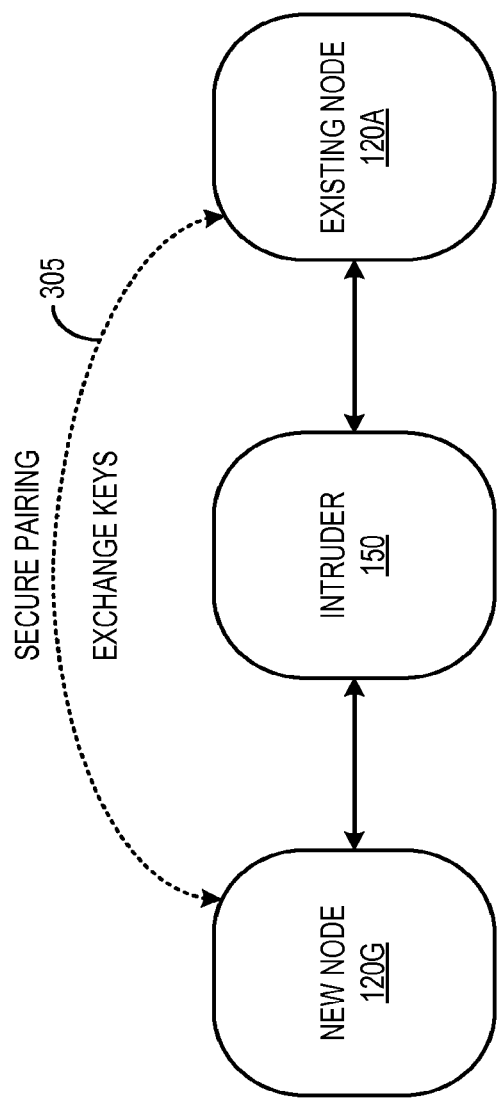
FIG. 3 is a schematic diagram illustrating an example new node joining a wireless network by exchanging keys with an existing node.

Turning now to FIG. 3, a schematic diagram illustrates an example new node 120G joining a wireless network by exchanging keys with an existing node 120A over a radio channel 305, arranged according to one or more embodiments presented herein. The new node 120G can join the wireless network by exchanging keys with the existing node 120A over the radio channel 305. The technology disclosed herein can be utilized to avoid exposing the key as plain-text over the wireless network where it may otherwise be exploited by an outside intruder 150. If the outside intruder 150 can openly read a plain-text key exchange, the outside intruder 150 may be able to initiate a "man in the middle" exploit. In such an exploit, the outside intruder 150 represents themselves as the network to the new node 120G, and the outside intruder 150 represents themselves as the new node 120G to the existing node 120A within the network. The outside intruder 150 can deliver a fake key to the new node 120G and gets the real key from the existing node 120A. The outside intruder 150 can decrypt data going both directions and then re-encrypt the data so that neither the new node 120G nor the existing node 120A can recognize what is going on. Meanwhile, the outside intruder 150 has taken over full access and control of the wireless network link. The new node 120G and the existing node 120A will not communicate without the outside intruder 150 because they have different codes and will interpret each other as being on different networks. Thus, they will not establish their own connection to compare messages or identification information.

To prevent the "man in the middle" exploit, the technology discussed herein can provide a shared secret made up of, or based upon, the signal signature vector. The new node 120G and the existing node 120A can both obtain highly correlated signal signature vectors as discussed herein. When the signature vectors have been obtained, the new node 120G and the existing node 120A can be configured to send each other one or more confirmation messages encrypted with their individual keys, a one time use packet (aka, a "nonce"), and their signal signature vector. The new node 120G and the existing node 120A will not share the nonce until both have received the confirmation message. Thus, neither node can decrypt the confirmation message until after both messages have been exchanged. The outside intruder 150 cannot decrypt the messages without the corresponding nonce. That is, the nonce may be utilized so that the man-in-the-middle cannot change the keys as the keys may be locked inside a nonce-protected package. The outside intruder 150 also cannot fake nor extract the signal signature vector. Thus, the outside intruder 150 cannot create new fake messages. The outside intruder 150 can either stop the confirmation messages thus halting the pairing and destroying the man-in-the-middle attack, or forward the confirmation messages unaltered. If the outside intruder 150 forwards the confirmation messages unaltered, the new node 120G and the existing node 120A will discover that they have different individual keys once the nonces are delivered thereby detecting the man-in-the-middle attack.

Figure 4:
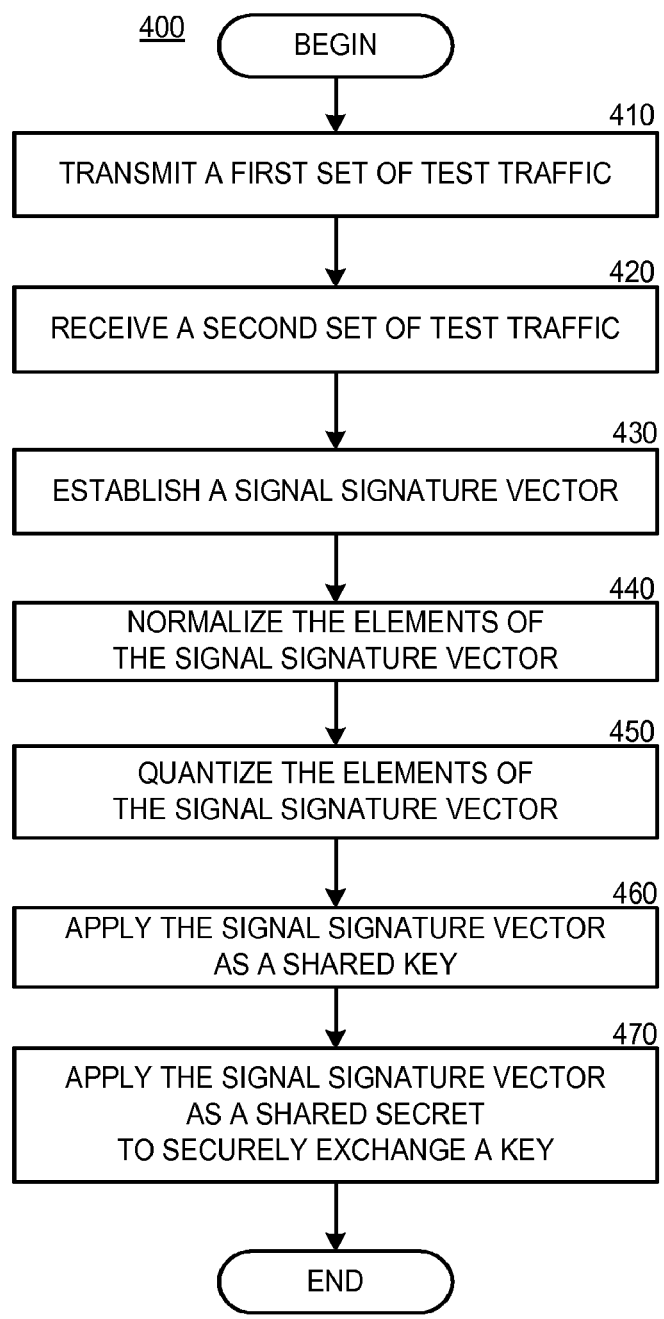
FIG. 4 is a flow diagram illustrating an example process for secure pairing into a wireless network.

Referring now to FIG. 4, additional details will be provided regarding the embodiments presented herein for applying radio channel metrics to secure pairing into a wireless network. In particular, FIG. 4 is an example flow diagram illustrating a process 400 for secure pairing into a wireless network according to at least some embodiments presented herein. Process 400 may include one or more operations, functions or actions as illustrated by one or more of blocks 410, 420, 430, 440, 450, 460, and/or 470.

It should be appreciated that the blocks described herein may be implemented as a sequence of computer implemented instructions or program modules running on a computing system, as interconnected machine logic circuits or circuit modules within the computing system, or some combination thereof. The implementation is a matter of choice dependent on the performance and other requirements of the various embodiments. Some of the logical operations described herein are referred to variously as state operations, functions, structural devices, actions, or modules. These operations, functions, structural devices, actions and modules may be implemented in software, in firmware, in special purpose digital logic, and any combination thereof. It should also be appreciated that in some implementations one or more of the illustrated blocks may be eliminated, combined or separated into additional blocks than those shown in the figures and described herein. These blocks may also be performed sequentially, in parallel, or in a different order than those described herein.

The process 400 may begin at block 410 (transmit a first set of test traffic). Block 410 may be followed by block 420 (receive a second set of test traffic). Block 420 may be followed by block 430 (establish a signal signature vector). Block 430 may be followed by block 440 (normalize the elements of the signal signature vector). Block 440 may be followed by block 450 (quantize the elements of the signal signature vector). Block 450 may be followed by block 460 (apply the signal signature vector as a shared key). Block 460 may be followed by block 470 (apply the signal signature vector as a shared secret to securely exchange a key). According to some embodiments, either or both of block 460 and block 470 may be performed. After block 470, processing may terminate. Further details about each block will be described below.

At block 410 (transmit a first set of test traffic), the secure pairing module 130 can be configured to transmit a set of test traffic out to other nodes 120 within the wireless network. The set of test traffic may include a specified number of packets, such as one hundred.

At block 420 (receive a second set of test traffic), the secure pairing module 130 can be configured to receive a set of test traffic from other nodes 120 within the wireless network. The set of test traffic may include a specified number of packets, such as one hundred, from each other node. Some subset of the test traffic transmitted from the other nodes 120 may be received at block 420.

At block 430 (establish a signal signature vector), the secure pairing module 130 can be configured to determine a reception percentage for the set of test traffic received at block 420. A signal signature vector can be formed with the reception probability of each other node being an entry within the vector.

At block 440 (normalize the elements of the signal signature vector), the secure pairing module 130 can be configured to normalize the elements of the signal signature vector established in operation 430. This normalization may be performed such that the highest probability of any element is unity or one. Performing this normalization can factor out any scaling variations within the signal signature vector.

At block 450 (quantize the elements of the signal signature vector), the secure pairing module 130 can be configured to increase the quantizing of the signal signature vector. This can reduce the accuracy of the measurements to a higher granularity such that minor variations between the directions of the channel are smoothed out. This also can increase the likelihood of the signature vectors being symmetrical.

At block 460 (apply the signal signature vector as a shared key), the secure pairing module 130 can be configured to use the signal signature vector as a shared secret key in order to securely exchange data with another node. Due to symmetry in the radio channel characteristics, the new node 120G and the existing nodes 120A-120F can have identical, or substantially similar signal signature vectors without ever transmitting the vector contents as clear-text. An outside intruder 150 is not likely to have similar enough radio channel to the pairing nodes to be able to reproduce their shared vector.

At block 470 (apply the signal signature vector as a shared secret to securely exchange a key), the secure pairing module 130 can be configured to use the shared signal signature vector to encrypt a node key and a nonce to create a confirmation message to securely exchange a key with another node. Other techniques may also be applied to secure a key using the shared secret signal signature vector to provide a secured key exchange.

Figure 5:
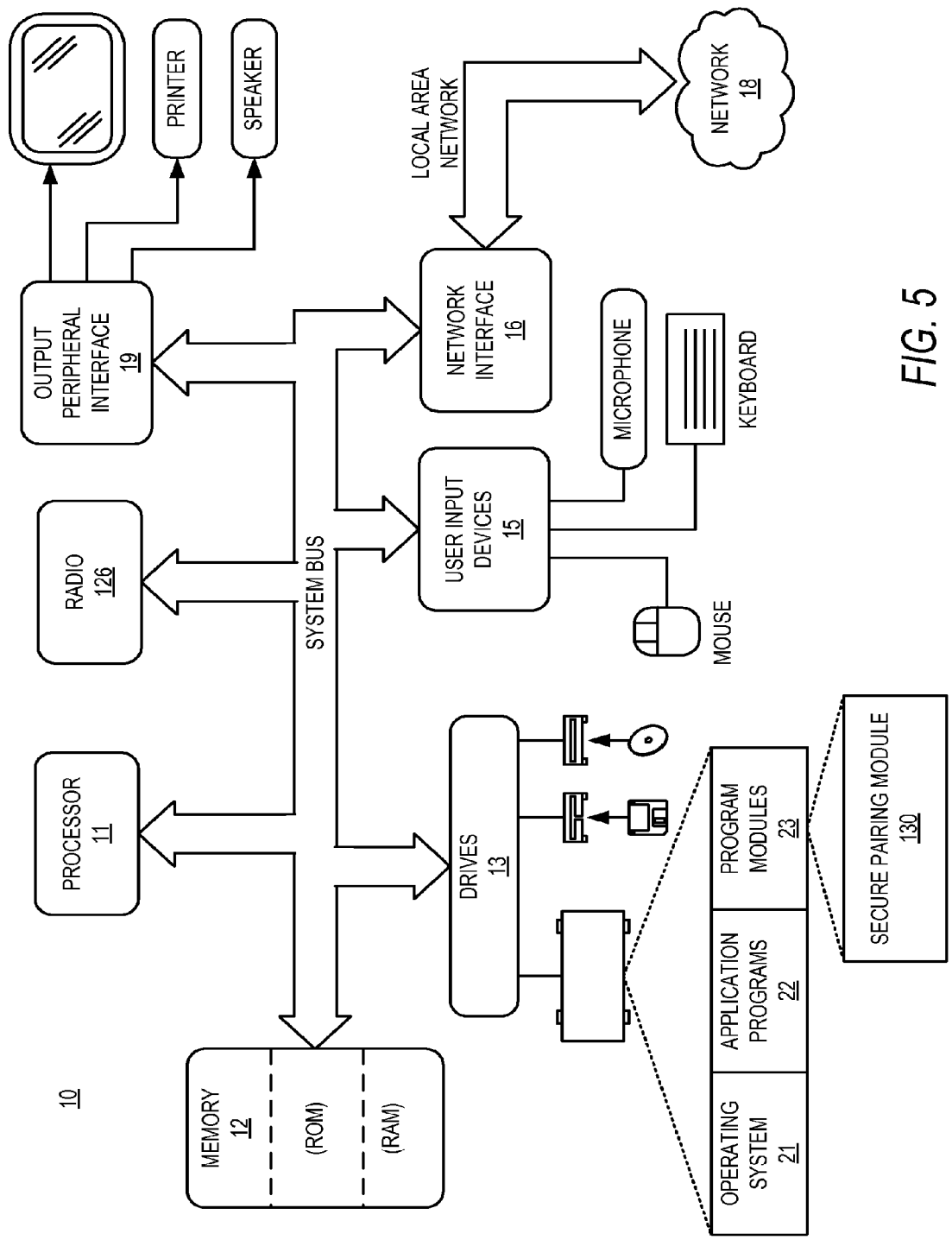
FIG. 5 is a block diagram illustrating an example computing system.

With reference to FIG. 5, an example computing device 10 for implementing various embodiments presented herein will be discussed. The computing device 10 may include a processor 11, a memory 12 and one or more drives 13. The drives 13 and their associated computer storage media may provide storage of computer readable instructions, data structures, program modules 23 and other data for the computing device 10. The computing device may be adapted to support embodiments for implementing secure pairing within a wireless network using radio channel metrics over the radio 126. For example, the computing device may comprise program modules 23 such as the secure pairing module 130 previously described herein. Various embodiments may include computers, dedicated hardware, or embedded computing devices.

The computing device 10 may be implemented as a conventional computer system, an embedded controller or processor, a laptop, or a server computer, a mobile device, a set-top box, a kiosk, a vehicular information system, a mobile telephone, a customized machine, or some other hardware platform. The processor 11 may be a general purpose processor, a processor core, a multiprocessor, a multicore processor, a graphics processor, a digital signal processing (DSP) processor, a customized computing device implemented within an application specific integrated circuit (ASIC), a customized computing device implemented within a field programmable gate array (FPGA), a customized computing device implemented within any type of programmable logic, a state machine, a reconfigurable processor, any other processing unit, or any combination or multiplicity thereof. The processor 11 may support parallel dynamic optimization leveraging multicore processors as discussed herein.

The drives 13, other storage devices, or their associated computer-readable storage media may store an operating system 21, application programs 22, and program modules 23. The computing device 10 may include user input devices 15 through which a user may enter commands and data. Input devices may include an electronic digitizer, a microphone, a keyboard, a pointing device, or any combination thereof. Examples of pointing devices may include a mouse, trackball, light pen, touch screen, or touch pad. Other input devices to the computing device 10 may include a joystick, game pad, satellite dish, scanner, or the like. Input devices may be coupled to processor 11 through a user input interface that is coupled to a system bus. The input devices may also be coupled by other interface and bus structures, such as a parallel port, game port or a universal serial bus (USB). Computers such as computing device 10 may also include other peripheral output devices such as speakers, which may be coupled through an output peripheral interface 19 or similar interface.

The computing device 10 may operate in a networked environment using logical connections to one or more computers, such as a remote computer coupled to network interface 16. The remote computer may be a personal computer, a server, a router, a network PC, a peer device, or other common network node. The remote computer may include many or all of the elements described herein relative to the computing device 10. Networking environments may include networks (WAN), local area networks (LAN), intranets, the Internet, or combinations thereof.

When used in a LAN or wireless LAN (WLAN) networking environment, the computing device 10 may be coupled to the LAN through a network interface 16 or a network adapter. When used in a WAN networking environment, the computing device 10 may include a modem or other mechanism for establishing communications over the WAN. The WAN may include the Internet, the illustrated network 18, various other networks, or any combination thereof. It should be appreciated that other mechanisms of establishing a communications link, ring, mesh, bus, cloud, or network between computers may be used.

According to one or more embodiments, computing device 10 may be configured such that the processor 11 and/or program modules 23 may perform secure wireless network pairing using metrics on the radio channels in accordance with various embodiments presented herein. The computing device 10 may include one or more instances of a physical computer-readable storage medium or media associated with drives 13 or other storage devices. The system bus may enable the processor 11 to read code and/or data to/from the computer-readable storage media. The media may represent an apparatus in the form of storage elements that are implemented using any suitable technology, including but not limited to semiconductors, magnetic materials, optical media, electrical storage, electrochemical storage, or any other such storage technology. The media may represent components associated with memory 12, whether characterized as RAM, ROM, flash, or other types of volatile or nonvolatile memory technology. The media may also represent secondary storage, whether implemented as the drives 13 or otherwise. Hard drive implementations may be characterized as solid state, or may include rotating media storing magnetically-encoded information.

The storage media may include one or more program modules 23 for secure wireless network pairing using metrics on the radio channels. The program modules 23 may include software instructions that, when loaded into the processor 11 and executed, transform a general-purpose computing system into a special-purpose computing system customized to facilitate all, or part of, the secure wireless pairing techniques disclosed herein. As detailed throughout this description, the program modules 23 may provide various tools or techniques by which the computing device 10 may participate within the overall systems or operating environments using the components, logic flows, and/or data structures discussed herein.

The processor 11 may be constructed from any number of transistors or other circuit elements, which may individually or collectively assume any number of states. More specifically, the processor 11 may operate as a state machine or finite-state machine Such a machine may be transformed to a second machine, or specific machine by loading executable instructions contained within the program modules 23. These computer-executable instructions may transform the processor 11 by specifying how the processor 11 transitions between states, thereby transforming the transistors or other circuit elements constituting the processor 11 from a first machine to a second machine, wherein the second machine may be specifically configured to support secure wireless network pairing using radio channel metrics. The states of either machine may also be transformed by receiving input from one or more user input devices 15, network interfaces 16, other peripherals, other interfaces, or one or more users or other actors. Either machine may also transform states, or various physical characteristics of various output devices such as printers, speakers, video displays, or otherwise.

Encoding the program modules 23 may also transform the physical structure of the storage media. The specific transformation of physical structure may depend on various factors, in different implementations of this description. Examples of such factors may include, but are not limited to: the technology used to implement the storage media, whether the storage media are characterized as primary or secondary storage, and the like. For example, if the storage media are implemented as semiconductor-based memory, the program modules 23 may transform the physical state of the semiconductor-based memory 12 when the software is encoded therein. For example, the software may transform the state of transistors, capacitors, or other discrete circuit elements constituting the semiconductor-based memory 12.

As another example, the storage media may be implemented using magnetic or optical technology such as drives 13. In such implementations, the program modules 23 may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. It should be appreciated that various other transformations of physical media are possible without departing from the scope and spirit of the present description.

Figure 6:
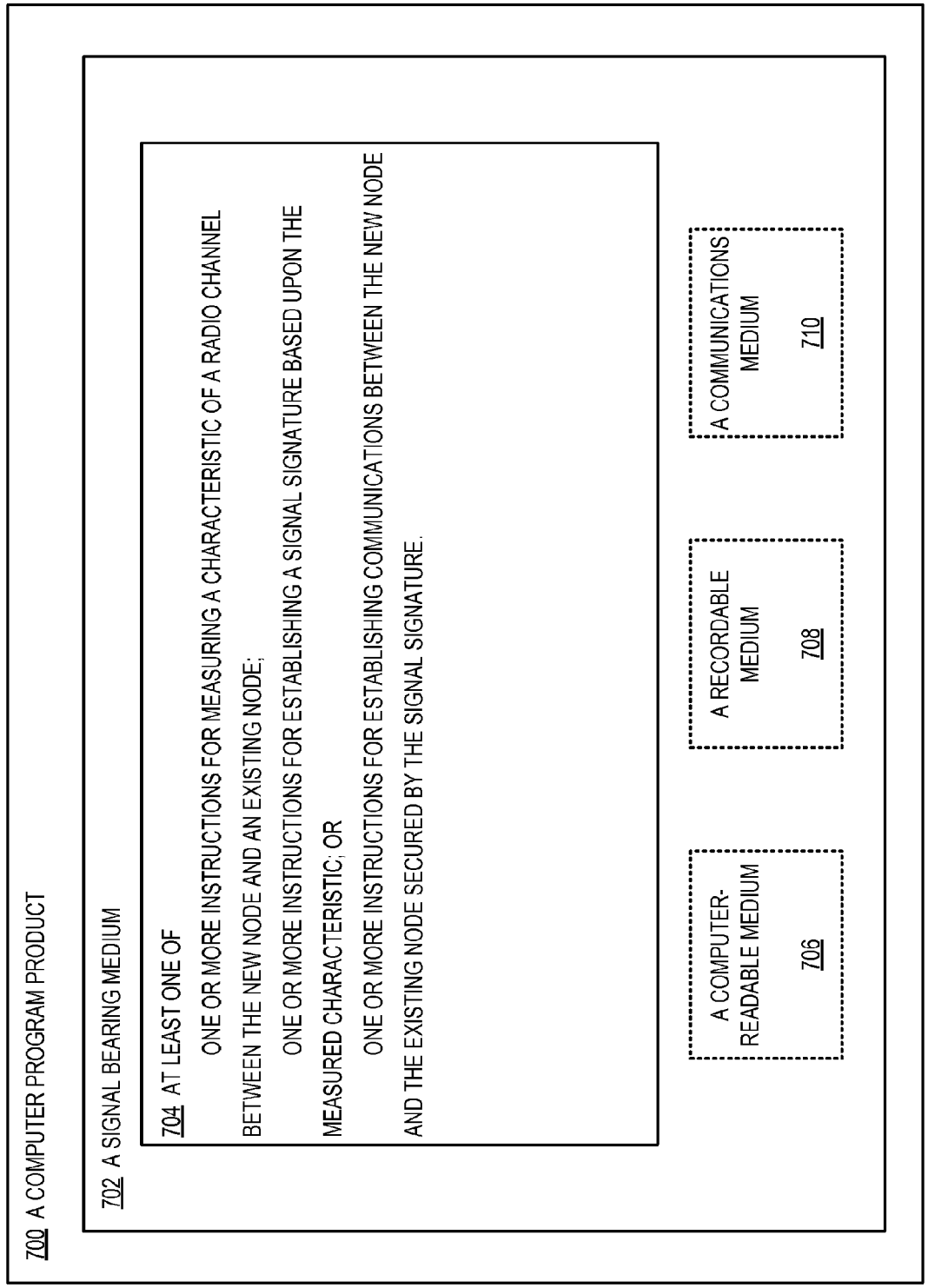
FIG. 6 is a schematic illustrating a partial view of an example computer program product that includes a computer program for executing a computer process on a computing device, all arranged according to at least some embodiments presented herein.

Turning now to FIG. 6, a schematic illustrates a partial view of an example computer program product 700 that includes a computer program for executing a computer process on a computing device, arranged according to at least some embodiments presented herein. An illustrative embodiment of the example computer program product is provided using a signal bearing medium 702, and may include at least one instruction of 704: one or more instructions for measuring a characteristic of a radio channel between the new node and an existing node, one or more instructions for establishing a signal signature based upon the measured characteristic, and/or one or more instructions for establishing communications between the new node and the existing node secured by the signal signature.

The one or more instructions may be, for example, computer executable and/or logic implemented instructions. In some embodiments, the signal bearing medium 702 of the one or more computer program products 700 include a computer-readable medium 706, a recordable medium 708, and/or a communications medium 710.

In some implementations, signal bearing medium 702 may encompass a computer-readable medium 706, such as, but not limited to, a hard disk drive, a Compact Disc (CD), a Digital Video Disk (DVD), a digital tape, memory, etc. In some implementations, signal bearing medium 702 may encompass a recordable medium 708, such as, but not limited to, memory, read/write (R/W) CDs, R/W DVDs, etc. In some implementations, signal bearing medium 702 may encompass a communications medium 710, such as, but not limited to, a digital and/or an analog communication medium (e.g., a fiber optic cable, a waveguide, a wired communications link, a wireless communication link, etc.). Thus, for example, computer program product 700 may be conveyed to one or more modules of the described systems by an RF signal bearing medium 702, where the signal bearing medium 702 is conveyed by a wireless form of communications medium 710 (e.g., a wireless communications medium conforming with the IEEE 802.11 standard).

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, components, elements, apparatuses, or systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

In instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 elements refers to groups having 1, 2, or 3 elements. Similarly, a group having 1-5 elements refers to groups having 1, 2, 3, 4, or 5 elements, and so forth.

While various aspects and examples have been disclosed herein, other aspects and examples will be apparent to those skilled in the art. The various aspects and examples disclosed herein are for purposes of illustration and are not intended to be limiting, with the true scope and spirit being indicated by the following claims.

What is claimed is:

1. A computer-implemented method for securely pairing a new node into a wireless network including a plurality of existing nodes, the method comprising:
    receiving, at the new node, a plurality of data packets from at least two of the plurality of existing nodes;
    measuring, at the new node, an attenuation-related characteristic of a radio channel between the new node and the at least two of the plurality of existing nodes in the wireless network based on the plurality of data packets received at the new node from the at least two of the plurality of existing nodes over the wireless network, wherein measuring the attenuation-related characteristic of the radio channel further includes
        determining a difference between a count number of the plurality of received data packets received at the new node and a specified count number of transmitted data packets transmitted by each of the at least two of the plurality of existing nodes;
    establishing, at the new node, a signal signature based upon each difference between the count number of the plurality of received data packets and the specified count number of transmitted data packets; and
    establishing, at the new node, secure communications between the new node and the existing node in the wireless network secured by the signal signature.

2. The computer-implemented method of claim 1, wherein establishing the signal signature based upon the measured characteristic of the radio channel comprises establishing a vector of signal signatures, wherein each of the signal signatures in the vector is associated with a respective radio channel between the new node and each of a plurality of existing nodes.

3. The computer-implemented method of claim 1, wherein establishing the signal signature based upon the measured characteristic of the radio channel comprises:
    determining a reception probability associated with the radio channel; and
    establishing the signal signature based upon the reception probability associated with the radio channel.

4. The computer-implemented method of claim 1, wherein establishing secure communications between the new node and the existing node in the wireless network secured by the signal signature comprises applying the signal signature as a shared key to securely exchange data between the new node and the existing node.

5. The computer-implemented method of claim 1, wherein establishing secure communications between the new node and the existing node in the wireless network secured by the signal signature comprises applying the signal signature as a shared secret to securely exchange a key between the new node and the existing node.

6. The computer-implemented method of claim 1, further comprising applying a quorum technique to tolerate variations in the signal signature.

7. A physical computer storage medium having non-transitory computer-executable instructions stored thereon for a method which, when executed by a computer, adapt the computer to securely pair a new node into a wireless network including a plurality of existing nodes by a method comprising:
    receiving, at the new node, a plurality of data packets from at least two of the plurality of existing nodes;
    measuring, at the new node, an attenuation-related characteristic of a radio channel between the new node and the at least two of the plurality of existing nodes in the wireless network based on the plurality of data packets received at the new node from the at least two of the plurality of existing nodes over the wireless network, wherein measuring the attenuation-related characteristic of the radio channel further includes
        determining a difference between a count number of the plurality of received data packets received at the new node and a specified count number of transmitted data packets transmitted by each of the at least two of the plurality of existing nodes;
    establishing, at the new node, a signal signature based upon each difference between the count number of the plurality of received data packets and the specified count number of transmitted data packets; and
    establishing, at the new node, secure communications between the new node and the existing node in the wireless network secured by the signal signature.

8. The non-transitory computer storage medium of claim 7, wherein establishing the signal signature based upon the measured characteristic of the radio channel comprises establishing a vector of signal signatures, wherein each of the signal signatures in the vector is associated with a respective radio channel between the new node and each of a plurality of existing nodes.

9. The non-transitory computer storage medium of claim 7, wherein establishing the signal signature based upon the measured characteristic of the radio channel comprises:
    determining a reception probability associated with the radio channel; and
    establishing the signal signature based upon the reception probability associated with the radio channel.

10. The non-transitory computer storage medium of claim 7, wherein establishing secure communications between the new node and the existing node in the wireless network secured by the signal signature comprises applying the signal signature as a shared key to securely exchange data between the new node and the existing node.

11. The non-transitory computer storage medium of claim 7, wherein establishing secure communications between the new node and the existing node in the wireless network secured by the signal signature comprises applying the signal signature as a shared secret to securely exchange a key between the new node and the existing node.

12. The non-transitory computer storage medium of claim 7, further comprising applying a quorum technique to tolerate variations in the signal signature.

13. An apparatus adapted to establish a secure communication channel between a new node and an existing node in a wireless network, the apparatus comprising:
    a radio configured to receive and transmit radio communication over a radio channel between the new node and the existing node; and
    a controller that is coupled to the radio and configured to:
        measure, at the new node, an attenuation-related characteristic of a radio channel between the new node and at least two existing nodes in the wireless network based on determining a difference between a count number of a plurality of received data packets received at the new node and a specified count number of transmitted data packets transmitted from each of the at least two existing nodes over the wireless network, establish, at the new node, a signal signature based upon each difference between the count number of the plurality of received data packets and the specified count number of transmitted data packets, and establish, at the new node, secure communications between the new node and the existing node in the wireless network secured by the signal signature without transmitting the signal signature from the new node to the existing node.

14. The apparatus of claim 13, wherein the signal signature comprises a vector.

15. The apparatus of claim 13, wherein the controller is configured to cooperate with the radio to transmit a first set of test traffic and receive a second set of test traffic, wherein the controller is configured to measure the characteristic of the radio channel based on the first set of test traffic and the second set of test traffic.

16. The apparatus of claim 13, wherein the controller is configured to normalize the signal signature.

17. The apparatus of claim 13, wherein the controller is configured to quantize the signal signature.

18. The apparatus of claim 13, wherein, to establish secure communications between the new node and the existing node in the wireless network secured by the signal signature, the controller is further configured to apply the signal signature as a shared key.

19. The apparatus of claim 13, wherein, to establish secure communications between the new node and the existing node in the wireless network secured by the signal signature, the controller is further configured to apply the signal signature as a shared secret to securely exchange a key.

20. The apparatus of claim 19, wherein the controller is further configured to encrypt the key that includes the signal signature, a node key, and a nonce.

* * * * *